United States Patent [19]

Lyon

[11] Patent Number: 4,961,319
[45] Date of Patent: Oct. 9, 1990

[54] METHOD OF TURBOCHARGER CONTROL

[75] Inventor: Kim M. Lyon, Bloomfield Hills, Mich.

[73] Assignee: Chrysler Corporation, Highland Park, Mich.

[21] Appl. No.: 289,177

[22] Filed: Dec. 22, 1988

[51] Int. Cl.⁵ .............................................. F02B 37/12
[52] U.S. Cl. .................................................... 60/602
[58] Field of Search .................................. 60/600–603

[56] References Cited

U.S. PATENT DOCUMENTS

| 4,179,247 | 12/1979 | Osborn | 60/602 |
|---|---|---|---|
| 4,378,960 | 4/1983 | Lenz . | |
| 4,403,913 | 9/1983 | Fisker . | |
| 4,471,616 | 9/1984 | Boudy . | |
| 4,490,622 | 12/1984 | Osborn | 60/602 X |
| 4,516,401 | 5/1985 | Jackson . | |
| 4,535,592 | 8/1985 | Zinsmeyer . | |
| 4,597,264 | 7/1986 | Cipolla . | |
| 4,671,068 | 6/1987 | Moody et al. | 60/602 |
| 4,794,759 | 1/1989 | Lyon | 60/602 |

FOREIGN PATENT DOCUMENTS

| 108413 | 7/1982 | Japan | 60/602 |
|---|---|---|---|
| 180031 | 10/1984 | Japan | 60/602 |
| 123718 | 6/1986 | Japan | 60/602 |

OTHER PUBLICATIONS

SAE Paper No. 860107, Variable Geometry Turbocharging with Electronic Control, Moody, Feb. 1986.
SAE Paper No. 890457, A High Power, Wide Torque Range, Efficient Engine with a Newly Developed Variable Geometry Turbocharger, Inoue, 1989.

Primary Examiner—Michael Koczo
Attorney, Agent, or Firm—Mark P. Calcaterra

[57] ABSTRACT

The present invention is a method for controlling the position of pivotally mounted vanes movable between open and closed operative positions to control gas flow to a turbine. The method includes checking whether the engine throttle is open, checking whether the throttle is wide open if the throttle is open, and determining whether the vehicle is moving if the throttle is not wide open. The method also includes determining whether the engine temperature is above a predetermined temperature if the vehicle is not moving and determining whether the manifold absolute pressure is greater than the barometric pressure if the engine is not above the predetermined temperature. The method further includes determining whether the engine RPM is greater than a predetermined RPM value if the engine temperature is above the predetermined temperature, and opening the vanes to a maximum position if the manifold absolute pressure is not greater than the barometric pressure.

32 Claims, 7 Drawing Sheets

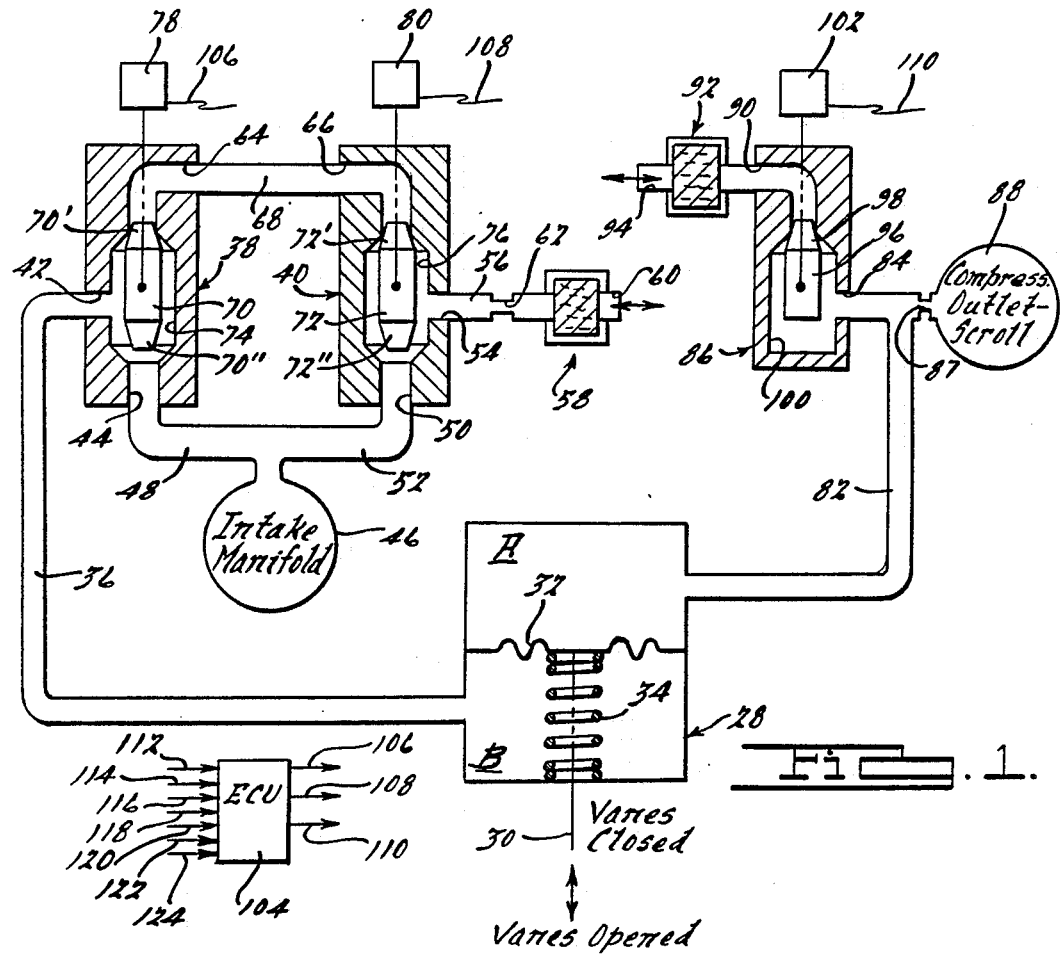
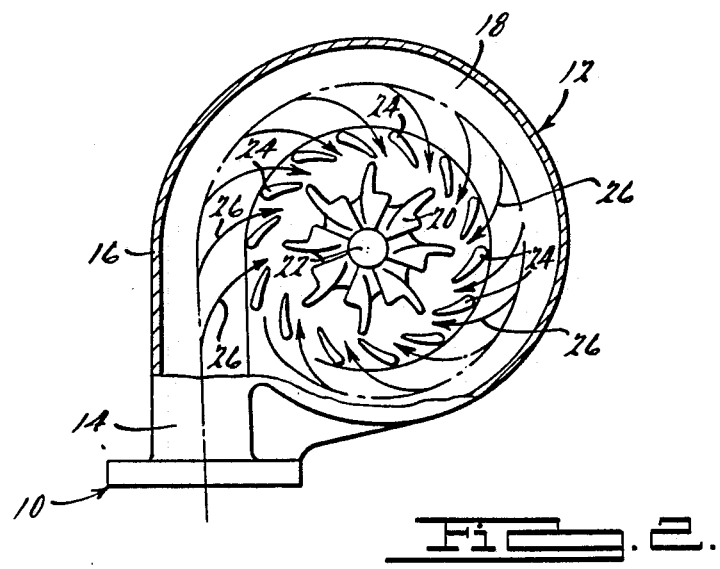

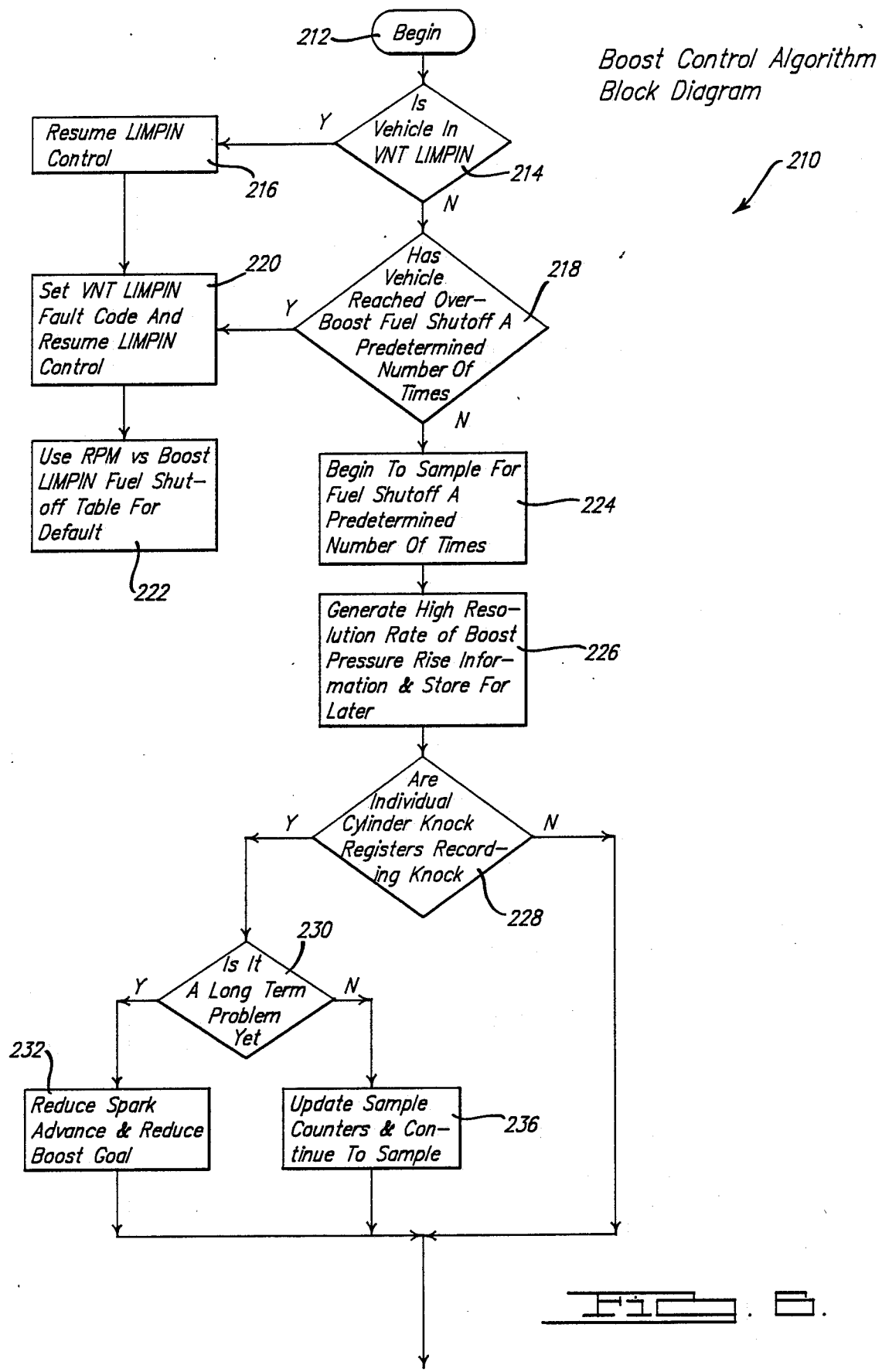

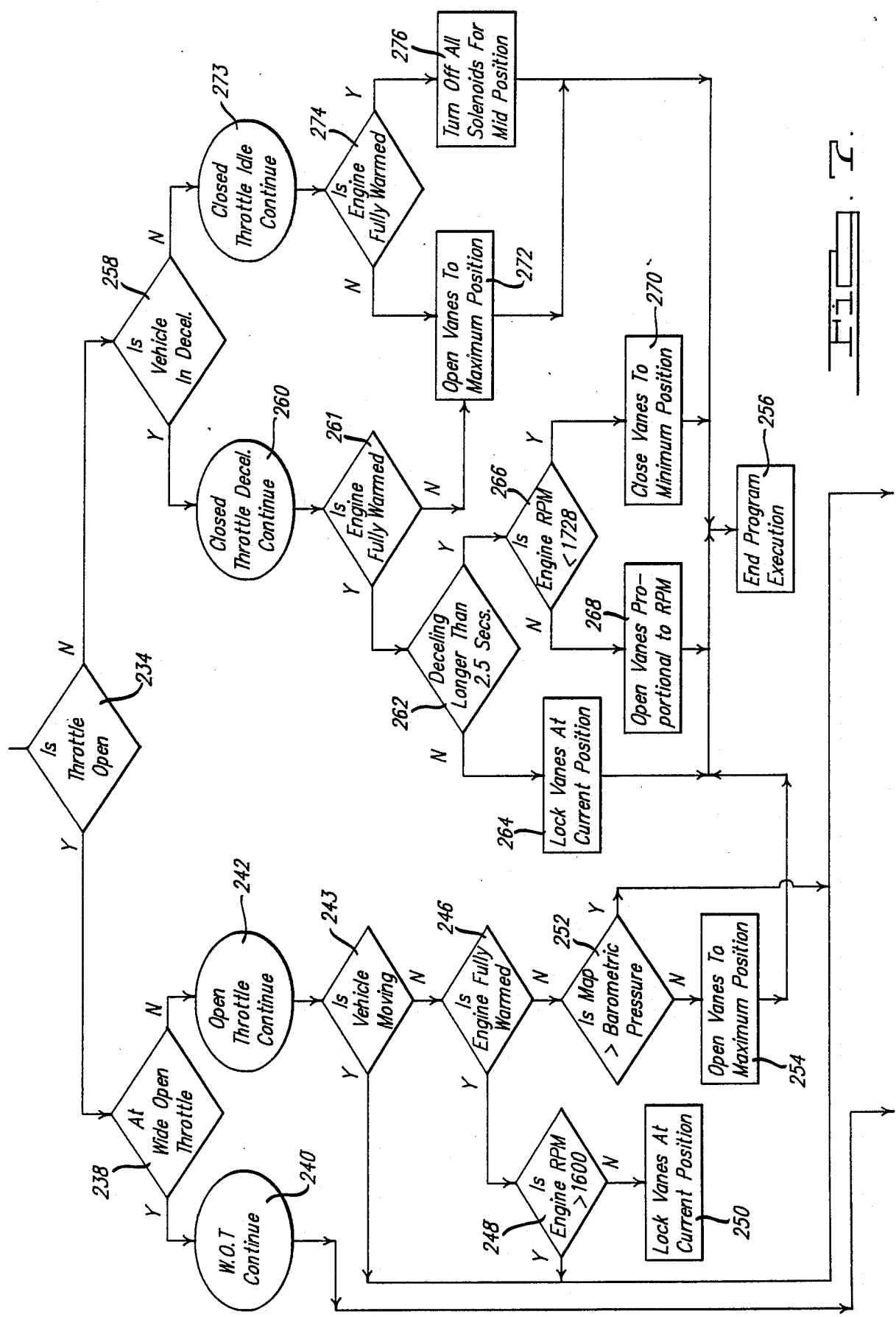

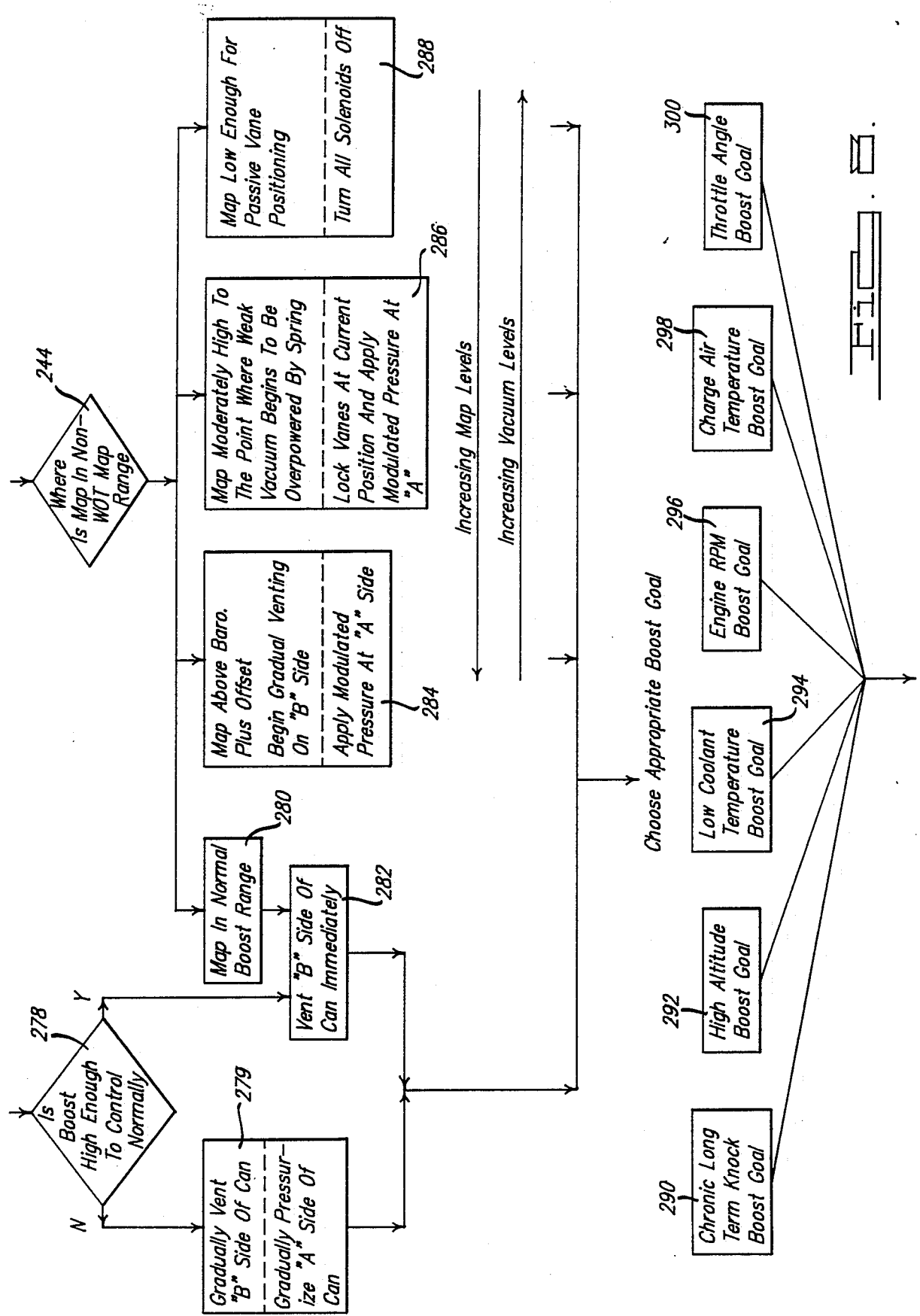

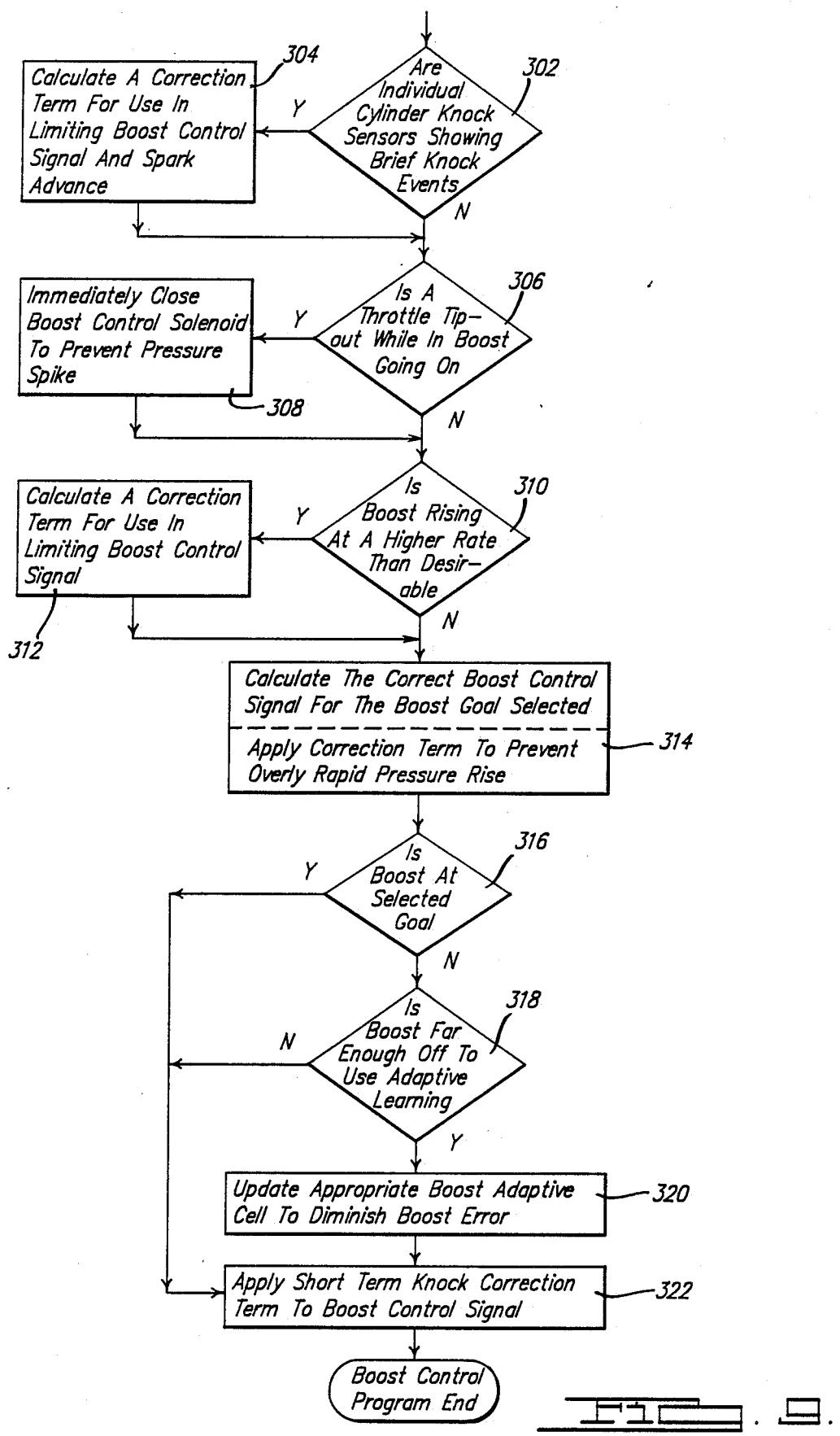

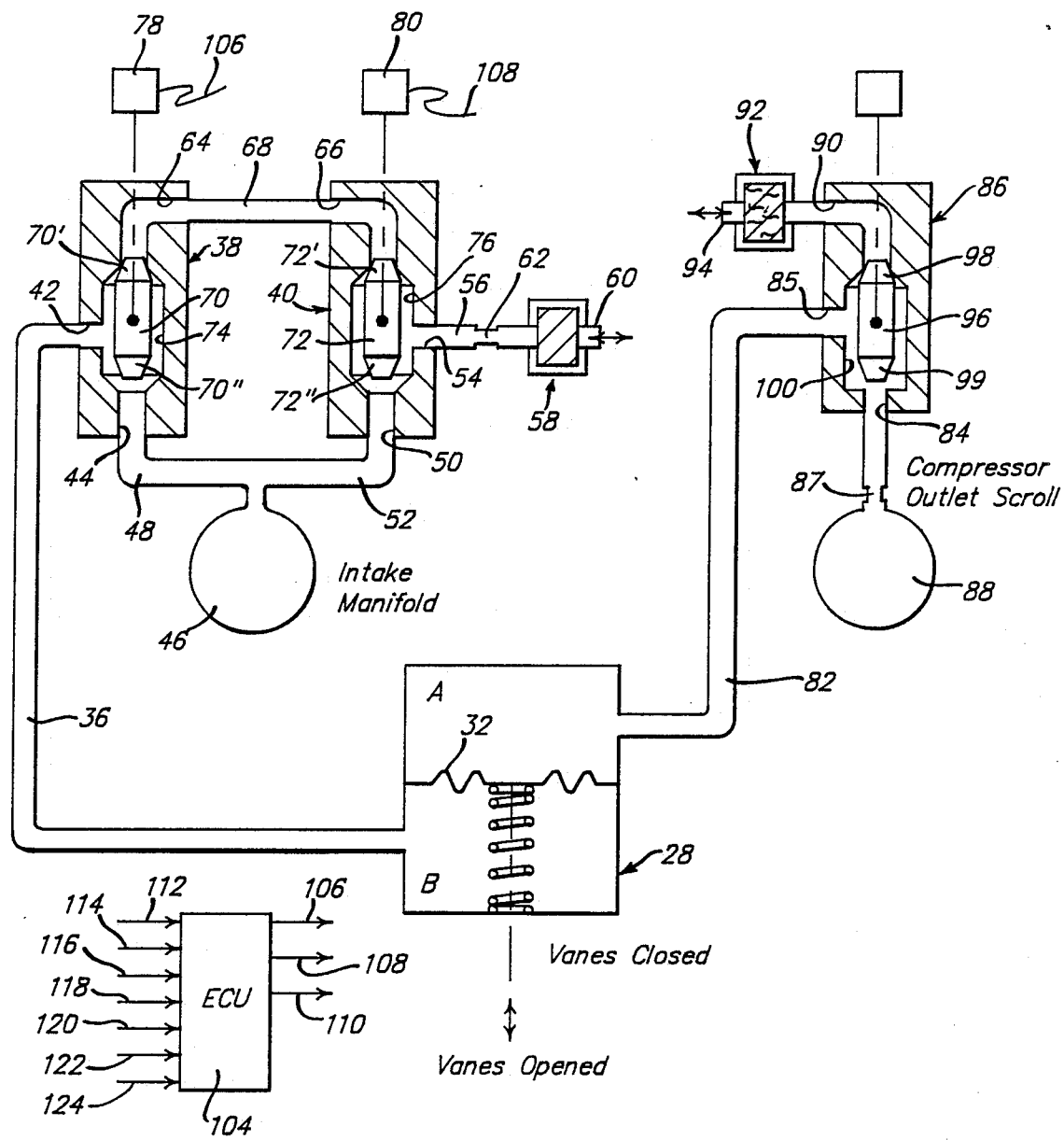

METHOD OF TURBOCHARGER CONTROL

RELATED APPLICATIONS

The present application is related to formerly co-pending application, Ser. No. 087,730, filed Aug. 21, 1987, entitled "TURBOCHARGER CONTROL" for inventor Kim M. Lyon, which is now U.S. Pat. No. 4,794,759, issued Jan. 3, 1989, commonly assigned to the Assignee of the present application, and is hereby incorporated by reference.

BACKGROUND OF THE INVENTION

1. Field of the Invention

The present invention relates to a method of turbocharger control for use in automotive engine applications.

2. Description of Related Art

Supercharging is generally defined as the introduction of air, or an air/fuel mixture into an engine cylinder adding density greater than ambient. An increase in the density of the air/fuel mixture allows an increase in the amount of fuel in the cylinder and thus a greater potential power output. The primary objective of supercharging is to increase engine power output.

A turbocharger is a specific type of supercharger. A turbocharger consists primarily of a compressor and a turbine coupled on a common shaft. With a turbocharger, the exhaust gasses from the engine are directed in the turbine inlet casing to the blades of the turbine and are discharged through the turbine outlet to the exhaust pipe. The exhaust gasses are used in the turbine to drive the supercharging compressor which compresses ambient air and directs it into the intake manifold from which it enters the cylinders mixed with injected fuel.

A waste gate has been added to most conventional turbochargers in automotive applications, which allows the exhaust gas to bypass the turbine and go straight to the exhaust system. At higher engine speeds, the waste gate opens further to prevent overspeed and, subsequently, overboost. The waste gate allows gas to bypass the turbocharger, controlling maximum boost, maximum turbine speed and engine back pressure.

One disadvantage of the waste gate is that the energy contained in the exhaust gas passing through the waste gate is wasted. The gas bypasses the turbocharger and no useful work is obtained from it. A waste gate is therefore an inefficient method of controlling the turbocharger speed, boost and engine back pressure.

The turbine of a turbocharger develops power, or torque, by changing the angular momentum of the exhaust gasses. A conventional turbocharger typically uses a nozzle to increase this angular momentum. A nozzle directs the flow of the gas into the turbine wheel at an optimum angle for specific turbine speed at a specific flow.

A variable area turbocharger and variable nozzle turbocharger are typical types of variable geometry turbochargers which vary the size of the turbine inlet area. A variable nozzle turbocharger varies the inlet area to vary the exhaust gas inlet velocity and momentum.

It is a primary objective of the present invention to provide a method of controlling the angular position of vanes that form the turbocharger nozzle so as to maximize the available energy of the exhaust gas stream and apply that energy to the turbine wheel.

SUMMARY OF THE INVENTION

Accordingly, the present invention provides a method for controlling the position of pivotally mounted vanes movable between open and closed operative positions to control gas flow to a turbine.

The present invention provides a more efficient, flexible and desirable process or technique for controlling the operation of a turbocharger by selectively varying the size of the turbocharger's intake for the exhaust gases. The present invention also provides better response to rapid opening of the throttle. The present invention further results in less exhaust back pressure being generated and increased power. The present invention is less expensive than conventional methods.

DESCRIPTION OF THE DRAWINGS

Other objects, features and advantages of the present invention will become more fully apparent from the following detailed description of the preferred embodiment, the appended claims and in the accompanying drawings in which:

FIG. 1 is a somewhat schematic and section view of the turbocharger control to regulate inlet vane position;

FIG. 2 is an end view of the turbocharger's turbine portion revealing movable inlet vanes which control exhaust flow admitted to turbine blades supported on a shafted wheel;

FIGS. 6-9 are flow charts showing one method used to control the turbocharger;

FIG. 10 is a schematic and section view of an alternate embodiment of FIG. 1.

DETAILED DESCRIPTION OF THE PREFERRED EMBODIMENT

Figure 3:
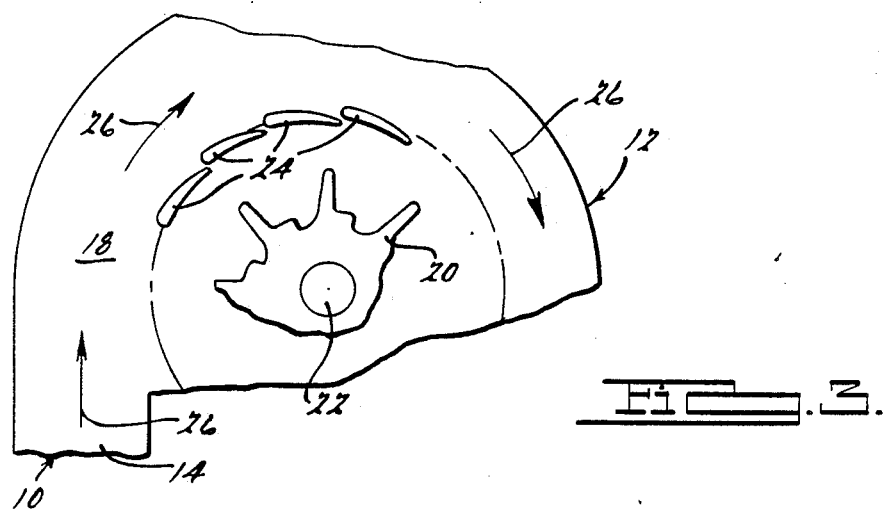
FIGS. 3-5 are views similar to FIG. 2 but showing three different positions of the inlet vanes.
Figure 4:
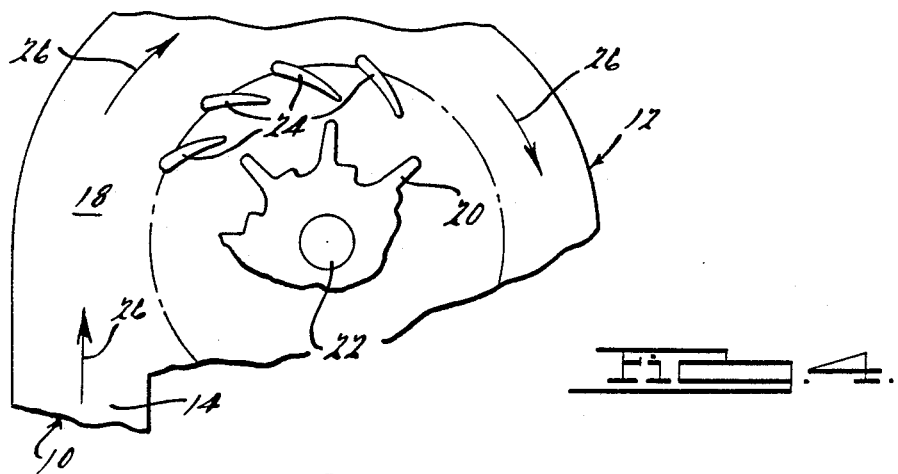
Figure 5:
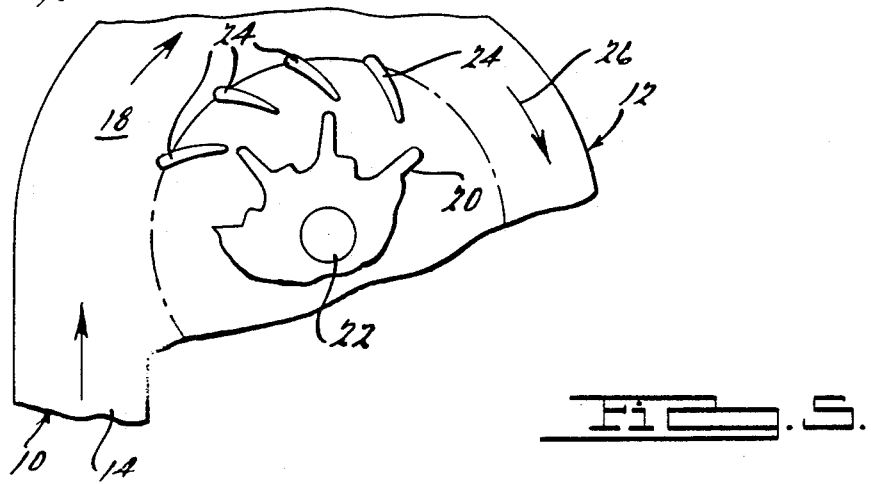

Referring to FIG. 2, the turbocharger assembly 10 includes a turbine portion 12 which has inlet defining means 14 to admit engine exhaust gases to the turbine. The turbocharger assembly 10 and particularly the turbine portion 12 includes a generally hollow housing or enclosure 16 like a scroll or a spirally extending interior gas passage 18. Passage 18 extends from the inlet 14 to a centrally located turbine wheel 20 having a plurality of blades as is known in the turbocharger art. The turbine wheel 20 is attached to a shaft 22 in accordance with the typical practice in turbocharger construction. A plurality of pivotally mounted vanes 24 are placed in the gas passage 18 and encircle the turbine wheel 20. The vanes 24 have a generally teardrop cross-sectional configuration with a rounded leading edge relative to the gas flow passing through the turbine wheel as indicated by numeral 26. The vanes 24 are pivotable about axes extending normally to the plane of the drawing (FIG. 2), approximately halfway between the leading and trailing edge of the vane. In FIGS. 3 through 5, respectively, the vanes 24 are illustrated first in a closed operative position, then in a normal cruise or 40% to 50% opened position and, finally, a fully open position.

Referring to FIG. 1, functionally, vanes 24 are interconnected so that they pivot simultaneously. This movement is by means including the fluid pressure responsive actuator or can 28. The can 28 has a linearly movable output member 30 (shown schematically). One end of the output member 30 is attached to a movable diaphragm 32. A spring 34 in the can 28 exerts a force on member 32 which tends to move members 30, 32 toward the closed vane position.

The can 28 is generally hollow and defines two chambers A and B which are separated by the movable diaphragm 32. Chamber B is fluidly connected by conduit means or a tube 36 to valve means which specifically include two selectively activated valves 38, 40. The first valve 38 has an inlet port 42 connected to the tube 36 and an inlet port 44 connected to the engine's intake manifold 46 by another conduit or tube 48. Thus, when in the deactivated condition shown in FIG. 1, vacuum pressure from the manifold 46 is directly connected to the chamber B.

The second valve 40 has an inlet port 50 which is connected by conduit or tube 52 to the intake manifold 46. Valve 40 also has a second port 54 which is connected by conduit 56 to a filter assembly 58. Filter assembly 58 fluidly communicates with the atmosphere through opening 60. The fluid communication between atmosphere and the port 54 is limited by a reduced diameter or orifice 62 therebetween. When in the deactivated condition shown in FIG. 1, vacuum pressure originating from the intake manifold 46 and as transmitted to chamber B is subject to a bleed of air at atmospheric pressure through the opening 60. This reduces the vacuum strength and its effect on the diaphragm 32 of the can 28.

Each of the valves 38, 40 have other ports 64 and 66, respectively. The ports 64 and 66 are interconnected by a conduit or tube 68. Each of the valves 38 and 40 have a movable valving member 70 and 72, respectively. The members 70, 72 are movable within enlarged interior spaces 74 and 76 of the valves 38 and 40, respectively. The upper end 70' and 72' of member 70 and 72 seal the ports 64 and 66 when the valves are in the illustrated deactivated condition.

The valving members 70 and 72 are operably connected to valve control devices 78 and 80, respectively. These devices are preferably in the form of electrically powered solenoid devices, each having a normal deactivated and biased positions corresponding to illustrated positions of valves 70, 72 in FIG. 1. When activated, the devices 78, 80 move the valving members 70, 72 downward so that the lower end portions 70 " and 72" seal the ports 44 and 50 respectively. When both of the valves 38 and 40 are in the activated condition, chamber B is directly connected to atmosphere through ports 64, 66 and orifice 62. Meanwhile, the intake manifold is isolated from atmosphere and chamber B.

Chamber A of the actuator 28 is fluidly connected by a conduit or tube 82 to a port 84 of a third selectively activated valve 86. The port 84 is also connected to a source 88 of pressurized air downstream from the compressor wheel 20 (see FIG. 2). The source 88 is also connected to the conduit 82 to provide a positive or direct fluid path from the source 88 to the chamber A. This is known as positive actuator routing (PAR). Valve 86 includes another port 90 which is connected through a filter assembly 92 and opening 94 to atmosphere. A movable valving member 96 has an upper end portion 98 which seals the port 90 when the valving member 96 is in the deactivated condition illustrated in FIG. 1.

Alternatively, as illustrated in FIG. 10, chamber A of the can 28 is fluidly connected by the conduit 82 to a port 85 of the third selectively activated valve 86. The source 88 of pressurized air downstream from the compressor wheel 20 is fluidly connected to a port 84 of the valve 86. This configuration is known as semi-positive actuator routing (SEMI-PAR).

In the deactivated position of valve 86, the valving member 96 exposes chamber A to the pressurized air from the compressor or outlet side of the turbocharger in the PAR and SEMI-PAR configurations. The pressurized air in chamber A tends to move the diaphragm and member 30 downward. Downward movement moves the turbocharger's vanes toward a more open position (see FIGS. 4, 5).

The valving member 96 is housed and is movable in an enlarged interior 100 of the valve 86. Member 96 is operationally connected to a solenoid device 102 like the other devices 78, 80. When activated in the PAR configuration, the device 102 moves the valving member 96 downward and exposes chamber A to air at atmospheric pressure. When the scroll pressure source 88 of the compressor is generating significant air pressure, this atmospheric exposure reduces pressure in chamber A which tends to allow movement of the diaphragm 32 and member 30 upward. This movement corresponds to a movement of the vanes 24 toward a more closed position (see FIGS. 3, 4).

When activated in the SEMI-PAR configuration, the device 102 moves the valving member 96 downward to seal the port 85 and exposes chamber A to air at atmospheric pressure. This atmospheric exposure reduces pressure in chamber A which tends to allow movement of the diaphragm 32 and member 30 upward. Hence, the vanes 24 move toward a more closed position (see FIGS. 3, 4).

The solenoid devices 78, 80 and 102 are subject to individual and selective activation so that the valving members 70, 72, 96 apply desired levels of pressurized fluid to chambers A and B of the actuator 28. Resultantly, the vanes 24 are positioned for prevailing or anticipated engine and vehicle operative conditions and a corresponding desired turbocharger action is produced. The selective activation is accomplished by means of a computer or electronic control unit (ECU) 104 which receives engine and vehicle-related inputs, then selects a desired action in accordance with a methodology to be described herein, and finally generates at least one output to be transmitted to devices 78, 80 and 102. The devices may be fully activated so that the respective valving members move to the opposite position from that shown in FIG. 1 or the devices may be cycled between deactivated and activated positions at varying frequencies.

In FIG. 1, the ECU 104 has three outputs 106, 108, and 110. These outputs correspond to the identically labeled leads of the devices 78, 80 and 102. The ECU 104 has seven inputs 112, 114, 116, 118, 120, 122 and 124. Input 112 feeds the ECU 104 with engine temperature data. Input 114 feeds ECU 104 with engine speed data. Input 116 feeds the ECU 104 with vehicle speed data. Input 118 feeds the ECU 104 with intake manifold pressure data. Input 120 feeds the ECU 104 with the throttle angle data. Input 122 feeds the ECU 104 with engine detonation or knock input. Input 124 feeds the ECU 104 with charge air temperature.

Referring to FIG. 6, the boost control methodology 210 is shown. It should be appreciated that the control methodology 210 may be used for either the PAR or SEMI-PAR configuration previously described. At the beginning or start of the methodology in bubble 212, the methodology advances to diamond 214 and determines whether the vehicle is in a limp-in mode from input data to the ECU 104. Limp-in occurs, for example, when there has been a failure of chamber A of the can 28. This may occur when the diaphragm 32 is ripped or torn. The methodology limits boost generation of the turbocharger when limp-in occurs to prevent a catastrophic failure. If the vehicle is in limp-in, the methodology advances to block 216 and resumes limp-in control. The methodology then advances to block 220 to be described. If the vehicle is not in limp-in, the methodology advances to diamond 218 and determines whether the vehicle has reached overboost fuel shut-off a predetermined number of times by looking at a counter in the ECU 104. An overboost fuel shut-off is a complete fuel shut-off. This occurs when the intake manifold pressure rises above a predetermined value such as 15 p.s.i. If an overboost fuel shut-off has occurred the predetermined number of times, the methodology advances to block 220 and sets the limp-in fault code and resumes limp-in control. In block 220, the ECU 104 resumes limp-in control and advances to block 222. In block 222, the ECU 104 obtains a default value from either an interpolation from a point/slope curve or a look-up table of R.P.M. vs. boost limp-in fuel shut-off table. It should be appreciated, however, that a formula calculation could be used in place of the look-up table.

At diamond 218, if the vehicle has not reached overboost fuel shut-off for the predetermined number of times, the methodology advances to block 224 and begins to sample with counters for the predetermined number of fuel shut-offs such as two for example. Once this has been accomplished, the methodology advances to block 226 and generates a high resolution rate of manifold absolute or boost pressure rise information and stores this information in memory of the ECU 104 for later use to be described herein. In other words, a change in manifold absolute pressure (MAP) vs. time is determined and stored in memory for later use. This information is used for transient boost control.

The methodology then advances to diamond 228 and determines whether the individual cylinder knock registers are recording detonation or knock from input 222. If the cylinder knock registers are recording knock, the methodology advances to diamond 230 and determines whether the knock is a long-term problem based on the time elapsed. If knock is a long-term problem, the methodology advances to block 232 and reduces the spark advance of the engine and boost goal to be described. This is because a knock problem may cause damage to the engine if boost is used. The methodology then advances to diamond 234 to be described herein. At diamond 230, if the knock is not a long-term problem, the methodology advances to block 236 and updates the sample counters used in block 229 and continues to sample. The methodology then advances to diamond 234. At diamond 228, if the individual cylinder knock registers are not recording knock, the methodology advances to diamond 234.

At diamond 234, the ECU 104 determines whether the throttle of the vehicle engine is open. In other words, the ECU 104 determines whether the throttle angle of the throttle plate (not shown) is greater than a predetermined angle from input 120. If so, the methodology advances to diamond 238 and determines whether the throttle is at wide open throttle (WOT) from input 120. If the throttle is at WOT, the methodology advances to bubble 240 and continues WOT analysis. If the throttle is open but not at WOT, the methodology advances to bubble 242 to continue open throttle analysis. The methodology advances to diamond 243 and determines whether the vehicle is moving from input data on input 116. If the vehicle is moving, the methodology advances to diamond 244 to be described herein.

At diamond 243, if the vehicle is not moving, the methodology advances to diamond 246 and determines whether the engine is fully warmed by checking engine temperature data from input 112. If the engine is fully warmed, the methodology advances to diamond 248 and determines whether the engine R.P.M. is greater than a predetermined value such as 1600 r.p.m from input data on input 114. If the engine R.P.M. is not greater than 1600 R.P.M., the methodology advances to block 250 and locks the vanes 24 at their current position by sealing the chamber B and maintaining the pressure in chamber A, continuing program execution. If the engine R.P.M. is greater than 1600 R.P.M., the methodology advances to diamond 244.

At diamond 246, if the engine is not fully warmed, the methodology advances to diamond 252. At diamond 252, the ECU 104 determines whether MAP is greater than the barometric pressure measured by input data on input 118. If so, the methodology advances to diamond 244. Otherwise, the methodology advances to block 354 and opens the vanes 24 to their maximum position by applying full available engine vacuum to chamber B. The methodology then advances to block 256 and ends the program or methodology execution.

At diamond 234, the methodology determines whether the throttle is open as previously described. If the throttle is not open, the methodology advances to diamond 258 and determines whether the vehicle is decelerating from input data on input 116 and input 120. If so, the methodology advances to bubble 260 and continues closed throttle deceleration. The control methodology advances to diamond 261 and determines whether the engine is fully warmed as previously described. If the engine is fully warmed, the methodology advances to diamond 262 and determines whether the vehicle deceleration is longer than a predetermined time period, for example, 2.5 seconds. If the vehicle deceleration is not longer than 2.5 seconds, the methodology advances to block 264 and locks the vanes 24 at their current position as previously described and advances to block 256 to end program execution.

At diamond 262, if the vehicle deceleration is longer than 2.5 seconds, the methodology advances to diamond 266 and determines whether the engine R.P.M. is less than a predetermined value such as 1728 R.P.M. as previously described If the engine R.P.M. is not less than 1728 R.P.M., the methodology advances to block 268 and opens the vanes 24 proportional to the engine R.P.M. by regulating the pressure in chambers A and B. The methodology then advances to block 256 and ends the program execution. If the engine R.P.M. is less, the methodology advances to diamond 270 and closes the vanes 24 to their minimum position by venting chamber B and advances to block 256 to end program execution.

At diamond 261, if the methodology determines that the engine is not fully warmed, the methodology advances to block 272 and opens the vanes 24 to their maximum position as previously described. The methodology advances to block 256 and ends program execution.

At diamond 258, if the methodology determines that the vehicle is not decelerating, the methodology advances to bubble 273 and continues closed throttle idle analysis. The methodology then advances to diamond 274 and determines whether the engine is fully warmed as previously described. If the engine is not fully warmed, the methodology advances to block 272 previously described. If the engine is fully warmed, the methodology advances to block 276 and turns off all the solenoids 70, 72 and 96 for mid position maintained by the vacuum air bleed previously described. The methodology then advances to block 256 to end program execution.

As illustrated in FIG. 8, the methodology advances from bubble 240 to diamond 278. At diamond 278, the methodology determines whether the boost is high enough by exceeding a predetermined value stored in memory. If not, the methodology advances to block 279 and gradually vents the B side of the can 28 and gradually pressurizes the A side of the can 28. Once this has been completed, the methodology advances to choose the appropriate boost goal to be described herein.

At diamond 278, if the boost is high enough to control, the methodology advances to block 282 and vents the B side of the can 28 immediately. Once this has been completed, the methodology advances to choose the appropriate boost goal to be described herein.

At diamond 244, the methodology determines where MAP is in the non-WOT MAP range. Once this has been accomplished, the methodology then advances to either of blocks 280, 284, 286 or 288 depending on where MAP is in the non-boost range. The MAP may be in the normal boost range in block 280. If so, the methodology advances to block 282 previously described. Alternatively, in block 284, MAP may be above the barometric pressure plus a predetermined offset pressure stored in memory. The ECU 104 then begins to gradually vent the B side of the can 28 and apply modulated pressure at the A side of the can 28.

At block 286, MAP is moderately high to the point where a weak vacuum begins to be overpowered by the spring 34. The methodology locks the vanes 24 at their current position as previously described and applies modulated pressure at the A side of the can 28.

At block 288, MAP is low enough for passive vane positioning. The ECU 104 turns off all the solenoids 70, 72 and 96. Thus, MAP levels increase from block 288 to block 282 while the vacuum levels increase from block 282 to block 288. Once the ECU 104 has executed blocks 282, 284, 286 or 288, the methodology advances to choose the appropriate boost goal.

The appropriate boost goal is based on engine design, etc. The boost goal is chosen by the ECU 104 based on the above conditions arising. The appropriate boost goals available are as follows: a chronic long-term knock boost goal in block 290; a high altitude boost goal in block 292; a low coolant temperature boost goal in block 294; an engine R.P.M. boost goal in block 296; a charge air temperature boost goal in block 298; and throttle angle boost goal in block 300.

Once the appropriate boost goal has been chosen, the methodology advances from the respective blocks to diamond 302 as illustrated in FIG. 9. At diamond 302, the methodology determines whether the individual cylinder knock registers previously described are showing brief knock events based on time elapsed. In other words, the ECU 104 determines whether short term knock exists. Preferably, the spark advance is reduced. Then, if necessary, the methodology advances to block 304 and calculates a correction term for use in limiting the boost control signal and spark advance.

Once this has been accomplished or the individual cylinder knock registers are not showing brief knock events, the methodology advances to diamond 306. At diamond 306, the methodology determines whether a throttle tip-out or when the operator lets up on the accelerator is occuring while in boost control by measuring the change in throttle angle from input 120. If so, the methodology advances to block 308 and immediately energizes the boost control solenoid to prevent a pressure spike from occuring to the can 28. Once this has been accomplished or the throttle tip-out is not occuring while in boost, the methodology advances to diamond 310 and determines whether boost is rising at a rate greater than a predetermined rate stored in memory from input 118. If so, the methodology advances to block 312 and calculates a correction term for use in limiting the boost control signal. Once this has been accomplished or the boost is not rising at a rate higher than the desirable rate, the methodology advances to block 314.

At block 314, the ECU 104 calculates the correct boost control signal for the boost goal selected and applies the correction term to prevent an overly rapid pressure rise. Once this has been accomplished, the methodology advances to diamond 316 and determines whether the boost is at the selected goal. If the boost is at the selected goal, the methodology advances to block 322 and applies a short-term knock correction term to the boost control signal if knock is present and tested previously in the methodology. The methodology then ends the boost control program.

At diamond 316, if the boost is not at the selected goal, the methodology advances to diamond 318 and determines whether the boost is far enough off from the boost at the selected goal to use adaptive learning. If not, the methodology advances to block 322 previously described. If so, the methodology advances to block 320 and updates the appropriate boost adaptive cell to diminish boost error. The methodology then applies the short-term knock correction term to the boost control signal in block 322. The methodology then ends the boost control program.

The present invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the present invention may be practiced otherwise than as specifically described.

What is claimed is:

1. In a vehicle having an engine and a turbocharger for increasing the density of at least the air entering a cylinder of the engine, the turbocharger including at least a compressor and a turbine coupled by a shaft and a nozzle to increase the angular momentum of the flow of gas to the turbine, the nozzle having a housing and movable vanes to vary the angle and velocity that the exhaust gas hits the wheel of the turbine, an actuator for moving the vanes, a can separated by a diaphragm and having an A side and B side for actuating the actuator, a spring disposed within the can between the diaphragm and an end of the B side of the can, a plurality of solenoid-actuated valves for controlling the pressure in the A and B sides of the can, an electronic control unit (ECU) having memory for storing data and predetermined values and for actuating and de-actuating the solenoid-actuated valves, a plurality of inputs to the ECU for providing input data indicative of engine temperature, engine speed, vehicle speed, intake manifold pressure, throttle angle, engine knock and charge air temperature, method for controlling the pressure of the gas to the turbine, said method comprising the steps of:

checking whether the vehicle is in a limp-in mode;

ending boost control method if vehicle is in limp-in mode;

checking whether the vehicle has reached an overboost fuel shutoff a predetermined number of times since the vehicle was last started if the vehicle is not in the limp-in mode;

ending boost control method if the vehicle has reached the overboost fuel shutoff for the predetermined number of times since the vehicle was last started;

generating a rate of change in the manifold absolute pressure (MAP) and storing in memory the rate;

determining whether the individual cylinder knock registers of the engine cylinders are recording knock;

checking whether the knock is a long-term problem if the registers are recording knock;

reducing the spark advance and boost goal if the knock is a longterm problem;

checking whether the throttle angle of the engine is greater than a first predetermined angle stored in memory;

determining whether the vehicle is in a deceleration if the angle of the throttle is not greater than the predetermined angle;

checking whether the throttle angle is greater than a second predetermined angle stored in memory if the throttle angle is greater than the first predetermined angle;

determining whether the vehicle is moving if the throttle angle is not greater than the predetermined angle;

determining whether the engine temperature is above a predetermined temperature stored in memory if the vehicle is or is not moving;

determining whether the engine revolutions per minute (RPM) are greater than a predetermined RPM value stored in memory if the engine temperature is above the predetermined temperature;

locking the vanes at their current position if the engine RPM is not greater than the predetermined RPM value;

determining whether the vehicle deceleration is greater than a predetermined time period if the engine temperature is not above the predetermined temperature;

locking the vanes at their current position if deceleration is not longer than the predetermined time period;

determining where MAP is in a non wide open throttle (WOT) MAP range if the engine RPM is greater than the predetermined RPM value;

opening the vanes to a maximum position if MAP is greater than the barometric pressure;

determining whether the engine RPM is less than a predetermined value if the vehicle deceleration is greater than the predetermined time period;

opening the vanes proportional to the engine RPM if the engine RPM is not less than the predetermined value;

closing the vanes to a minimum position if the engine RPM is less than the predetermined value;

deactuating all solenoid-actuated valves if the engine temperature is above the predetermined temperature whereby the vanes obtain a mid position;

locking the vanes at their current position if the vehicle deceleration is not longer than the predetermined time period;

opening the vanes to a maximum position if the engine temperature is not above the predetermined temperature;

locking the vanes at their current position and applying modulated pressure at A side of can if MAP is at a pressure value to overpower spring;

deactuating all solenoid-actuated valves if MAP is low enough for passive vane positioning;

creating the appropriate boost goal;

determining whether the individual cylinder knock sensors are sensing brief knock events;

determining if the throttle angle is decreasing while in boost;

determining whether boost is rising at a rate greater than a predetermined rate;

calculating a correction term for limiting the boost control signal if boost is rising at a rate greater than the predetermined rate;

determining whether boost is at the goal created;

applying a short-term knock correction term to the boost control signal if boost is at the goal created;

determining whether boost is far enough off of goal created to use adaptive learning if boost is not at goal created;

applying a short-term knock correction term to the boost control signal if boost is not far enough off to use adaptive learning;

updating the appropriate boost adaptive cell to diminish boost error if boost is far enough off to use adaptive learning;

applying a short-term knock correction term to the boost control signal; and ending boost control method.

2. A method as set forth in claim 1 including the step of sampling fuel shutoff for at least a predetermined number of times in the next predetermined time period.

3. A method as set forth in claim 2 including the step of determining whether the throttle is open if the registers are not recording knock.

4. A method as set forth in claim 3 including the step of determining whether boost is high enough to control if the throttle is not greater than the predetermined angle.

5. A method as set forth in claim 4 including the step of gradually venting B side of can and pressurizing A side of can if boost is not high enough to control.

6. A method as set forth in claim 5 including the step of venting B side of can immediately if boost is high enough to control.

7. A method as set forth in claim 6 including the step of gradually venting B side of can and applying modulated pressure at A side of can if MAP is above barometric pressure plus an offset.

8. A method as set forth in claim 7 including the step of locking the vanes at their current position and applying modulated pressure at A side of can if MAP is greater than a predetermined pressure value.

9. A method as set forth in claim 8 including the step of calculating a correction term for modifying the boost control signal if the sensors are sensing brief knock events.

10. A method as set forth in claim 9 including the step of opening immediately the boost control solenoid to prevent a pressure spike of the can.

11. A method as set forth in claim 10 including the step of calculating a correction term for limiting the boost control signal if boost is rising at a rate greater than the predetermined rate.

12. A method as set forth in claim 11 including the step of calculating the appropriate boost control signal for the boost goal created.

13. A method as set forth in claim 12 including the step of applying the correction term to the boost control signal.

14. In a vehicle having an engine and a turbocharger for increasing the density of at least the air entering a cylinder of the engine, the turbocharger including at least a compressor and a turbine coupled by a shaft and a nozzle to increase the angular momentum of the flow of gas to the turbine, the nozzle having a housing and movable vanes to vary the angle and velocity that the exhaust gas hits the wheel of the turbine, an actuator for moving the vanes, a can separated by a diaphragm and having an A side and B side for actuating the actuator, a plurality of solenoid-actuated valves for controlling the pressure in the A and B sides of the can, an electronic control unit (ECU) having memory for storing data and predetermined values and for actuating and de-actuating the solenoid-actuated valves, a plurality of inputs to the ECU for providing input data indicative of engine temperature, engine speed, vehicle speed, intake manifold pressure, throttle angle, engine knock and charge air temperature, method for controlling the position of pivotally mounted vanes movable between open and closed operative positions to control gas flow to the turbine, said method comprising the steps of:
  checking whether the engine throttle is open;
  checking whether the throttle is wide open if the throttle is open;
  determining whether the vehicle is moving if the throttle is not wide open;
  determining whether the engine temperature is above a predetermined temperature if the vehicle is not moving;
  determining whether the manifold absolute pressure (MAP) is greater than the barometric pressure if the engine is not above the predetermined temperature;
  determining whether the engine RPM is greater than a predetermined RPM value if the engine temperature is above the predetermined temperature; and
  opening the vanes to a maximum position if MAP is not greater than the barometric pressure.

15. A method as set forth in claim 14 including the step of determining where MAP is in a non-WOT MAP range if the vehicle is moving.

16. A method as set forth in claim 15 including the step of determining where MAP is in a non-WOT MAP range if MAP is greater than the barometric pressure.

17. A method as set forth in claim 16 including the step of determining whether the vehicle deceleration time is greater than a predetermined time period if the engine temperature is above the predetermined temperature.

18. A method as set forth in claim 17 including the step of locking the vanes at their current position if deceleration is not longer than the predetermined time period.

19. A method as set forth in claim 18 including the step of determining where MAP is in a non-WOT MAP range is the engine RPM is greater than the predetermined RPM value.

20. A method as set forth in claim 19 including the step of determining whether the engine RPM is less than a predetermined value if the vehicle deceleration time is greater than the predetermined time period.

21. A method as set forth in claim 20 including the step of opening the vanes proportional to the engine RPM if the engine RPM is not less than the predetermined value.

22. A method as set forth in claim 21 including the step of closing the vanes to a minimum position if the engine RPM is less than the predetermined value.

23. A method as set forth in claim 22 including the step of deactuating all solenoids if the engine temperature is above the predetermined temperature whereby the vanes obtain a mid position.

24. A method a set forth in claim 23 including the step of locking the vanes at their current position if the vehicle deceleration time is not longer than the predetermined time period.

25. A method as set forth in claim 24 including the step of opening the vanes to a maximum position if the engine temperature is not above the predetermined temperature.

26. A method as set forth in claim 25 including the step of determining whether boost is high enough to control if the throttle is not wide open.

27. A method as set forth in claim 26 including the step of gradually venting B side of can and pressurizing A side of can if boost is not high enough to control.

28. A method as set forth in claim 27 including the step of venting B side of can immediately if boost is high enough to control.

29. A method as set forth in claim 28 including the step of gradually venting B side of can and applying modulated pressure at A side of can if MAP is above the barometric pressure plus an offset.

30. A method as set forth in claim 29 including the step of locking vanes at their current position and applying modulated pressure at a side of can if MAP is at a pressure value to overpower spring.

31. A method as set forth in claim 30 including the step of deactuating all solenoids if MAP is low enough for passive vane positioning.

32. In a vehicle having an engine and a turbocharger for increasing the density of at least the air entering a cylinder of the engine, the turbocharger including at least a compressor and a turbine coupled by a shaft and a nozzle to increase the angular momentum of the flow of gas to the turbine, the nozzle having a housing and movable vanes to vary the angle and velocity that the exhaust gas hits the wheel of the turbine, an actuator for movng the vanes, a can separated by a diaphragm and having an A side and B side for actuating the actuator, a plurality of solenoid-actuated valves for controlling the pressure in the A and B sides of the can, an electronic control unit (ECU) having memory for storing data and predetermined values and for actuating and de-actuating the solenoid-actuated valves, a plurality of inputs to the ECU for providing input data indicative of engine temperature, engine speed, vehicle speed, intake manifold pressure, throttle angle, engine knock and charge air temperature, a method for controlling the pressure of a gas flow to the turbine, said method comprising the steps of:

determining whether the engine throttle is open;

determining whether the vehicle is in a deceleration if the throttle is not open;

determining whether the engine is at a predetermined temperature;

determining whether the throttle is wide open if the throttle is open;

determining whether the vehicle is moving if the throttle is not wide open;

determining whether the engine temperature is above a predetermined temperature if the vehicle is or is not moving;

determining whether the engine manifold absolute pressure (MAP) is greater than the barometric pressure if the engine is not above the predetermined temperature;

determining whether the engine revolutions per minute are greater than a predetermined RPM value if the engine is above the predetermined temperature;

locking the vanes at their current position if the engine RPM is not greater than the predetermined RPM value;

determining where MAP is in a non wide open throttle (WOT) MAP range if the vehicle is moving;

determining where MAP is in a non-WOT MAP range if MAP is greater than the barometric pressure;

determining whether the vehicle deceleration is greater than a predetermined time period if the engine temperature is not above the predetermined temperature;

locking the vanes at their current position if deceleration is not longer than the predetermined time period;

determining where MAP is in a non-WOT MAP range if the engine RPM is greater than the predetermined RPM value;

determining whether the engine RPM is less than a predetermined value if the vehicle deceleration is greater than the predetermined time period;

opening the vanes proportional to the engine RPM if the engine RPM is not less than the predetermined value;

closing the vanes to a minimum position if the engine RPM is less than the predetermined value;

deactuating all solenoid-actuating valves if the engine temperature is above the predetermined temperature whereby the vanes obtain a mid position;

determining whether the vehicle is in a limp-in mode;

ending boost control method if vehicle is in limp-in mode;

determining whether the vehicle has reached an overboost fuel shutoff a predetermined number of times since the vehicle was last started if the vehicle is not in the limp-in mode;

ending boost control method if the vehicle has reached an overboost fuel shutoff for the predetermined number of times since vehicle was last started;

sampling for the predetermined number of fuel shutoffs in the next predetermined time period;

generating a rate of change in MAP and storing the rate;

determining whether the individual cylinder knock registers are recording knock;

determining whether the throttle is open if the registers are not recording knock;

determining whether the knock is a long-term problem if the registers are recording knock;

reducing the spark advance and boost goal if the knock is a long-term problem;

updating the registers if the knock is not a long-term problem and continue sampling;

locking the vanes at their current position if the vehicle deceleration is not longer than the predetermined time period;

opening the vanes to a maximum position if the engine temperature is not above the predetermined temperature;

determining whether boost is high enough to control if the throttle is not wide opened;

gradually venting B side of can and pressurizing A side of can if boost is not high enough to control;

venting B side of can immediately if boost is high enough to control;

gradually venting B side of can and applying modulated pressure at A side of can if MAP is above the barometric pressure plus an offset;

locking the vanes at their current position and applying modulated pressure at A side of can if MAP is at a pressure value to overpower spring;

deactivating all solenoid-actuated valves if MAP is low enough for passive vane positioning;

creating the appropriate boost goal;

determining whether the individual cylinder knock sensors are sensing brief knock events;

calculating a correction term for modifying the boost control signal if the sensors are sensing brief knock events;

determining whether the throttle angle is decreasing while in boost;

energizing immediately the boost control solenoid-actuated valve to prevent a pressure spike if the throttle angle is decreasing while in boost;

determining whether boost is rising at a rate greater than a predetermined rate;

calculating a correction term for limiting the boost control signal if boost is rising at a rate greater than the predetermined rate;

calculating the appropriate boost control signal for the boost goal created;

applying the correction term to the boost control signal;

determining whether boost is at the goal created;

applying a short-term knock correction term to the boost control signal if boost is at the goal created;

determining whether boost is far enough off of goal created to use adaptive learning if boost is not at goal created;

applying a short-term knock correction term to the boost control signal if boost is not far enough off to use adaptive learning;

updating the appropriate boost adaptive cell to diminish boost error if boost is far enough off to use adaptive learning;

applying a short term knock correction term to the boost control signal;

ending boost control method.

* * * * *